US011530543B2

(12) United States Patent
Daughtridge et al.

(10) Patent No.: US 11,530,543 B2
(45) Date of Patent: Dec. 20, 2022

(54) FUNCTIONAL ERGONOMIC CINEMAS

(71) Applicant: Warehouse Cinemas LLC, Hagerstown, MD (US)

(72) Inventors: Richard E. Daughtridge, Hagerstown, MD (US); Gregory L. Mills, Hagerstown, MD (US)

(73) Assignee: WAREHOUSE CINEMAS LLC, Hagerstown, MD (US)

( * ) Notice: Subject to any disclaimer, the term of this patent is extended or adjusted under 35 U.S.C. 154(b) by 0 days.

(21) Appl. No.: 17/188,110

(22) Filed: Mar. 1, 2021

(65) Prior Publication Data

US 2021/0180352 A1 Jun. 17, 2021

Related U.S. Application Data

(63) Continuation of application No. 15/961,933, filed on Apr. 25, 2018, now abandoned, which is a
(Continued)

(51) Int. Cl.
*E04H 3/30* (2006.01)
*E04H 3/22* (2006.01)
(Continued)

(52) U.S. Cl.
CPC ............... *E04H 3/30* (2013.01); *A47C 1/02* (2013.01); *A47C 1/12* (2013.01); *E04H 1/005* (2013.01);
(Continued)

(58) Field of Classification Search
CPC ...... E04H 3/22; E04H 3/30; E04H 2001/1283; E04H 1/005; E04H 3/126; G03B 21/56;
(Continued)

(56) References Cited

U.S. PATENT DOCUMENTS 2,691,160 A * 10/1954 Byrd ................... F21S 8/081
362/240
3,598,470 A * 8/1971 Vetter ................. G03B 21/602
359/455

(Continued)

FOREIGN PATENT DOCUMENTS

EP 0987383 A1 * 3/2000

OTHER PUBLICATIONS

Shanghai Metal Corporation, https://shanghaimetalcorporation.wordpress.com/2014/10/17/the-many-architectural-applications-of-hipping-containers-vol-4/, The Many Architectural Applications of Shipping Containers vol. 4, Oct. 17, 2014.*

*Primary Examiner* — Brian E Glessner
*Assistant Examiner* — Daniel J Kenny
(74) *Attorney, Agent, or Firm* — WCF IP

(57) ABSTRACT

A movie theater auditorium is disclosed with reclining or reclined seats, whereby patrons are viewing a screen that is elevated and tilted toward the viewing audience. Comparative to traditional movie theaters with vertical screens with fixed or reclining chairs, exemplary embodiments provide a more natural viewing angle and line of sight for the viewing audience. Some embodiments are disclosed which employ repurposed shipping containers as structural elements of a cinema.

3 Claims, 14 Drawing Sheets

Related U.S. Application Data continuation of application No. 15/096,401, filed on Apr. 12, 2016, now abandoned.

(60) Provisional application No. 62/198,287, filed on Jul. 29, 2015, provisional application No. 62/148,817, filed on Apr. 17, 2015.

(51) Int. Cl.
| | |
|---|---|
| *A47C 1/02* | (2006.01) |
| *A47C 1/12* | (2006.01) |
| *E04H 1/00* | (2006.01) |
| *G03B 21/56* | (2006.01) |
| *E04H 3/12* | (2006.01) |
| *E04H 1/12* | (2006.01) |

(52) U.S. Cl.
CPC ............... *E04H 3/126* (2013.01); *E04H 3/22* (2013.01); *G03B 21/56* (2013.01); *E04H 2001/1283* (2013.01)

(58) Field of Classification Search
CPC ......... G03B 21/60; E04B 1/3483; A47C 1/12; A47C 1/02
See application file for complete search history.

(56) References Cited

U.S. PATENT DOCUMENTS

| | | | | |
|---|---|---|---|---|
| 6,164,018 | A * | 12/2000 | Runge | E04H 3/22 52/6 |
| 6,865,023 | B2 * | 3/2005 | Shafer | G09F 19/18 362/330 |
| 7,784,757 | B2 * | 8/2010 | Woods | F16M 11/10 248/231.91 |
| 9,140,027 | B2 * | 9/2015 | Ramirez | E04H 3/30 |
| 9,296,554 | B2 * | 3/2016 | Ferren | B65D 88/54 |
| 9,785,044 | B2 * | 10/2017 | Goeke | E04H 3/24 |

* cited by examiner

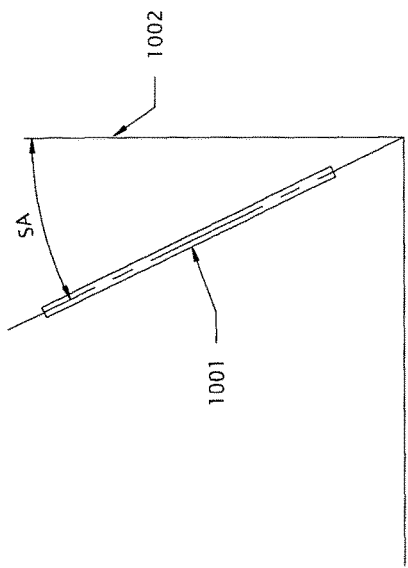
FIGURE 10: Screen Angle (SA)
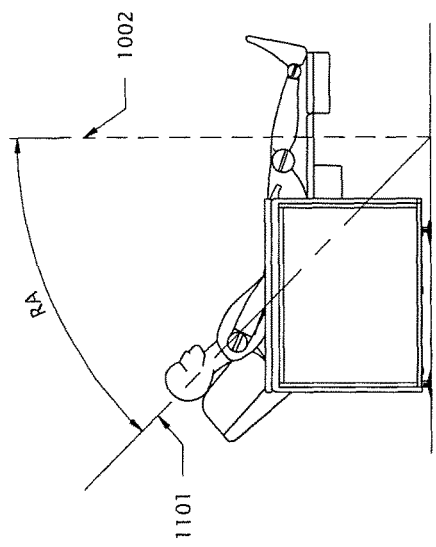
FIGURE 11: Recline Angle (RA)
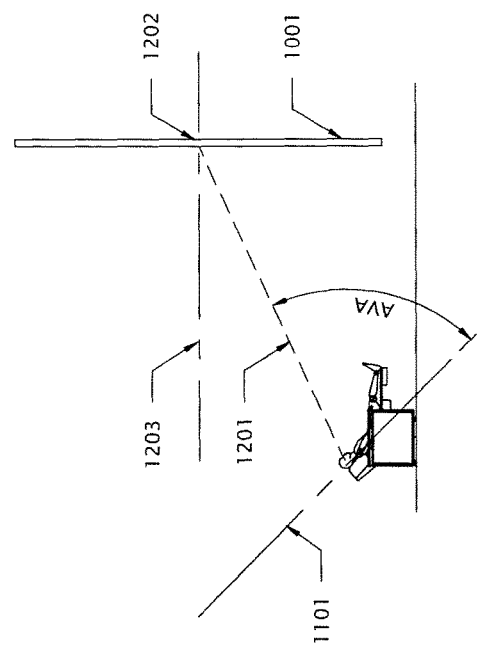
FIGURE 12: Audience Viewing Angle (AVA)
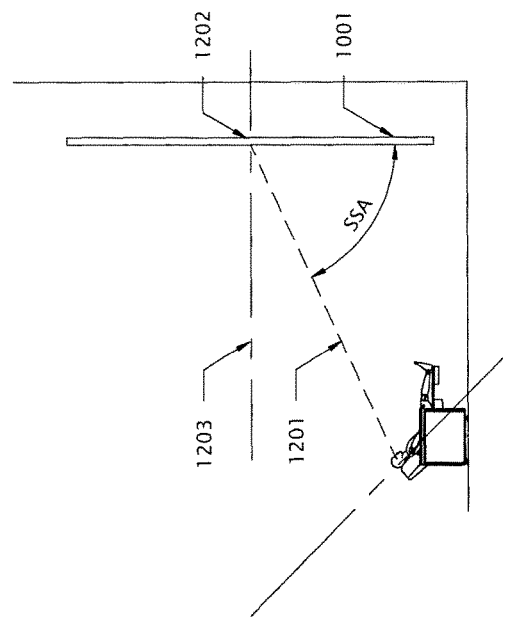
FIGURE 13: Screen Sight Angle (SSA)

FUNCTIONAL ERGONOMIC CINEMAS

CROSS-REFERENCE TO RELATED APPLICATIONS

This application claims the benefit of U.S. Provisional Patent Application Nos. 62/148,817, filed Apr. 17, 2015, and 62/198,287, filed Jul. 30, 2015. The complete contents of both provisional applications are hereby incorporated by reference.

FIELD OF THE INVENTION

The invention generally relates to movie theater auditoriums and, more particularly, advantageous configurations and combinations of seating, projection screens, and floors, for example.

BACKGROUND

Movie theater auditoriums are traditionally sloped floor (e.g., FIG. 3) or tiered stadium seating (e.g., FIG. 5) with the patron facing a vertical screen. In both arrangements, seats toward the back of the auditorium are higher in relation to seats toward the front in order to provide clear lines of sight for movie patrons as they sit in their seats.

Both traditional sloped floor and stadium seating models provide clear lines of sight but are difficult and costly to construct and provide accessibility challenges for Americans with Disabilities Act (ADA) compliance. Additionally, sloped floor and tiered floor movie theaters are generally regarded as single-use facilities, adding constraints to the landowner/developer and, ultimately, reducing the value of the property.

A growing trend in the exhibition industry is to install reclining or reclined seats in lieu of traditional high-occupancy seating arrangements. Moviegoers regard reclining seating (i.e., recliners) as a premium product, and the industry has seen a resulting demand for this viewing experience. While recliners take up more space in an auditorium and therefore reduce occupancy, moviegoers have demonstrated a willingness to pay a premium for the experience, proven by an increase in attendance. Consequently, reclining seating is common in new cinema construction worldwide and a growing number of existing movie theaters are replacing existing seating with recliners. Unfortunately, the addition of recliners to sloped and stadium seating configurations has exasperated an existing problem, namely unfavorable audience viewing angles (AVAs) and screen sight angles (SSAs).

SUMMARY

According to an aspect of some embodiments disclosed herein, cinema auditoriums are disclosed which combine reclining chairs with a tilted screen in configurations which provide ergonomically desirable audience viewing angles and screen sight angles.

According to another aspect of some embodiments disclosed herein, a cinema screen is elevated and tilted toward an audience in reclining chairs arranged on a flat floor, on a sloped floor, in a tiered stadium configuration, or in a drive-in configuration.

Depending on the configuration of the floor (e.g., flat, sloped, or tiered), variables of different embodiments (e.g., screen height/elevation, screen angle, screen size, recline angle, auditorium size, row location) are manipulated to produce optimal screen sight angles and audience viewing angles.

A cinema auditorium is disclosed which comprises, for example, a seating area with a flat floor, a plurality of reclining or reclined seats positioned within the seating area, a tilted motion picture projection screen positioned at a first end of the seating area, and a projector positioned at a second end of the seating area. The reclining seats have a variable recline angle from 15 degrees to 70 degrees, for example. The tilted motion picture projection screen is tilted toward the seating area with a screen angle of 10 degrees to 35 degrees, for example. A specific exemplary screen angle is 25 degrees. The projector can be angled upwardly with respect to the seating area for projecting images onto the screen. In many embodiments, the screen is elevated to a height such as 3 feet to 20 feet as measured from finished floor to the bottom edge of the screen. Some specific heights for example embodiments are, for example, 8 or 12 feet above the seating area floor. In some embodiments, the screen is flat or, alternatively, the screen is curved, e.g., from a left side to a ride side of the screen.

As a further aspect of some embodiments, a ceiling such as a drop ceiling is positioned above a portion or an entirety of the seating area and is sloped or stepped so that the end of the ceiling closest to the screen is higher than the opposite end (the end which is furthest from the screen). A sloped or stepped ceiling toward the screen provides an immersive experience without obstructive views.

In some embodiments, for example those involving the retrofitting of existing cinema auditoriums, the flat floor may instead be a sloped floor or a tiered floor. It should be appreciated, however, that these floor types are not equivalents and have separate advantages and disadvantages when implemented in combination with other cinema auditorium features disclosed herein.

According to yet a further aspect of some embodiments, methods are disclosed which provide a cinema auditorium in a warehouse space. For example, an exemplary method comprises arranging a plurality of reclining or reclined seats on a flat floor in a warehouse space to create a seating area, tilting a motion picture projection screen arranged at a first end of the seating area, and placing a projector at a second end of the seating area opposite the first end. The screen is tilted toward the seating with a screen angle of 10 to 35 degrees, for example. The projector may be angled upwardly with respect to the seating area in order to project images onto the screen. In addition, in some embodiments, a ceiling above a portion or entirety of the seating area is sloped toward the first end of the seating area, i.e., toward the screen. Alternatively, the ceiling may be stepped.

Various embodiments of the invention provide advantages over existing art such as reduced cost and improved ease of constructing a cinema auditorium, improved ADA accessibility, improved emergency egress, and greater flexibility of use for a facility (e.g., avoiding a cinema becoming a single use facility).

According to a further aspect of the invention, specific acoustics are provided which are specific to the combination of a sloped or stepped ceiling, reclined chairs, and/or tilted screen.

BRIEF DESCRIPTION OF THE DRAWINGS

FIG. 10 is an illustration of Screen Angle (SA);

FIG. 11 is an illustration of Recline Angle (RA);

FIG. 12 is an illustration of Audience Viewing Angle (AVA);

FIG. 13 is an illustration of Screen Sight Angle (SSA);

DETAILED DESCRIPTION

Figure 1:
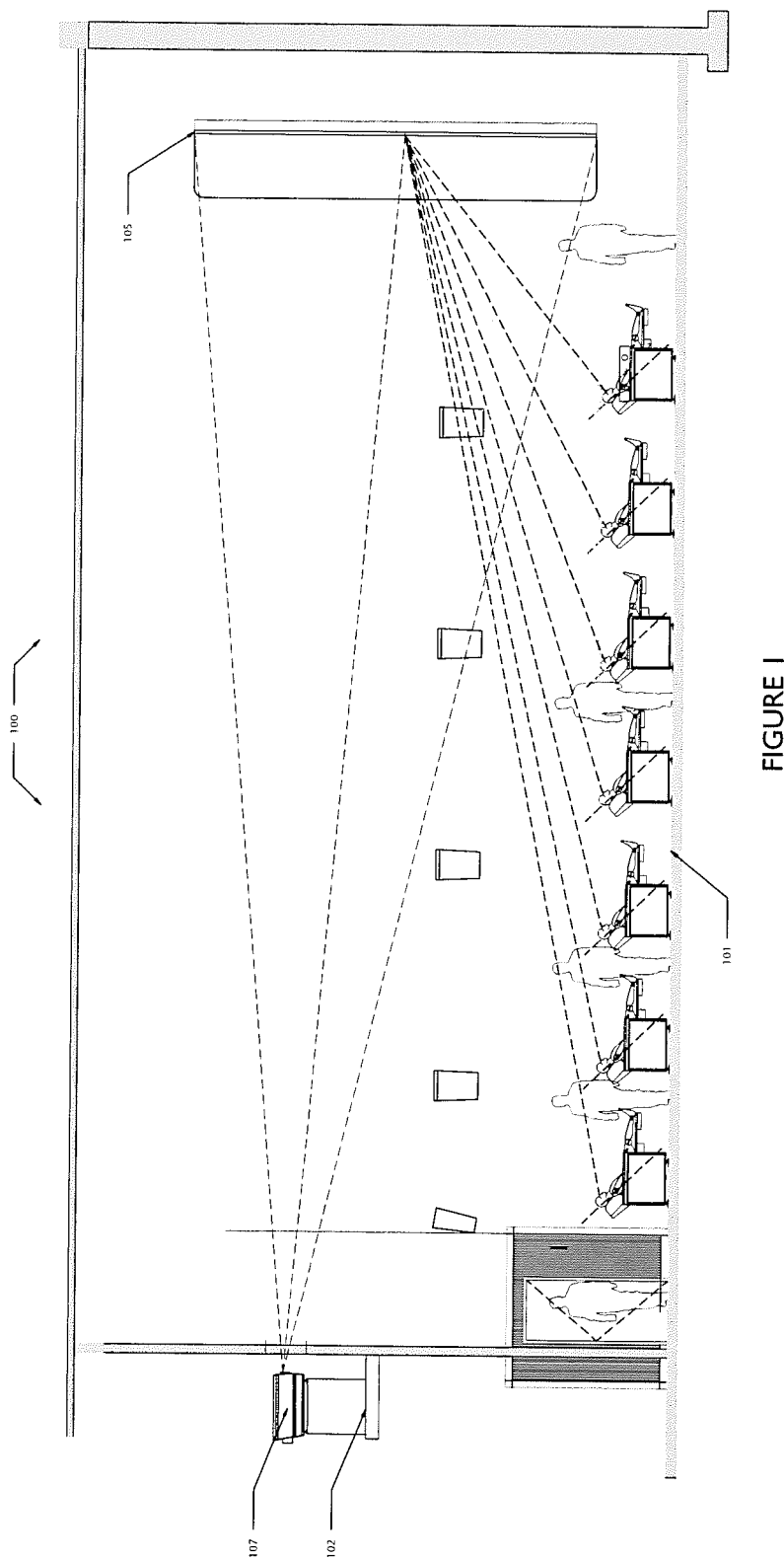
FIG. 1 is an auditorium with a flat floor and a vertical screen.

As used herein, "motion picture" and "movie" are interchangeable terms. Similarly, "motion picture theater", "movie theater", and "cinema" are treated as interchangeable terms.

Referring now to the drawings, various elements of an auditorium will be described using the terms "screen angle" (SA), "recline angle" (RA), "audience viewing angle" (AVA), and "screen sight angle" (SSA).

FIG. 10 illustrates screen angle. As used herein, "screen angle" (SA) is defined as the relative angle of a screen 1001 to the vertical axis 1002 of the ground. For example, a vertical screen has a 0 degree screen angle.

FIG. 11 illustrates recline angle. As used herein, "recline angle" (RA) is defined as the angle between the center bodyline 1101 of an audience member and vertical 1002. For example, an audience member seated in a vertical seat will have a 0 degree recline angle.

FIG. 12 illustrates audience viewing angle. As used herein, "audience viewing angle" (AVA) is defined as the relative vertical angle of the center bodyline 1101 of an audience member to his/her sightline 1201, where the sightline is directed to the vertical center 1202 of the screen 1001. For example, if the audience member is seated vertically and the centerline 1203 of the screen is higher than his/her eyes, the audience viewing angle will be obtuse.

FIG. 13 illustrates screen sight angle. As used herein, "screen sight angle" (SSA) is defined as the relative angle of the surface of the screen 1001 from its vertical center 1202 to the sightline 1201 of an audience member. For example, if the body of the audience member and the screen are both vertical, and the vertical center of the screen is the same height as the sightline of the audience member, the screen sight angle will be 90 degrees.

Common ergonomic consensus is that an optimal angle for everyday screen viewing is approximately 10 degrees below horizontal when seated vertically. Translated to screen viewing in a reclined position, the most natural relaxed audience viewing angle will be at or near 80 degrees (defined above as measured from body centerline). An optimal screen sight angle is considered to be 90 degrees (perpendicular) to the screen. Essentially, it is ergonomically easiest to view a screen that is perpendicular to one's line of sight. Therefore, an exemplary viewing experience will have:

1. audience viewing angles at or near 80 degrees
2. screen sight angles at or near 90 degrees Flat Floor Configuration FIG. 1 shows a motion picture theater (i.e, cinema) auditorium 100 that includes a flat floor 101. Unless otherwise specified, "flat floor" as used herein implies that the floor of the auditorium is substantially flat and level for most (e.g., over 50%, all but 10 or fewer seats, all but 2 or fewer rows) and generally all of the seats in the auditorium. Flat floors have the effect that the seats in the auditorium are at the same height or altitude (i.e., as measured from any level reference plane such as earth or sea level). Typically, the motion picture exhibition industry does not utilize a flat floor space for movie theaters because it is nearly impossible for all audience members to have a clear line of sight to the screen (especially to the bottom edge of the screen) when the seating is all on the same level.

FIG. 1 includes a vertical screen 105 (i.e., screen 105 has a screen angle of 0 degrees). It also includes a projector 107 arranged on a different level or floor 102 as compared to the seating area on the flat floor 101. Arranging the projector 107 on a different level or floor 102 of the theater is sometimes necessary in order to align the projector at or above the height of the vertical center of the screen 105. However, notable disadvantages exist with this arrangement. In particular, the facility must have a second level 102 with space to accommodate the projector 107. If a second level 102 does not already exist, provision must be made to establish a second level 102 which increases the cost of establishing the cinema.

In order for exhibitors to achieve clear lines of sight to the entire screen for all audience members, a special space must be built to elevate each seat with respect to any seats in front of such seat. Different seat heights or elevations clears up the lines of sight, eliminating or at least reducing the amount of screen surface obscured by seats or audience members positioned between the viewer in question and the screen. The result of arranging seats at different elevations is that most movie theaters are single-use facilities, specifically designed to provide all audience members a clear line of sight to the screen. Single-use facilities limit the flexibility of a space and therefore increasing the business risk to the landowner. Besides bearing the limitation of being a single-use facility, such conventional theater auditorium configurations come with a host of other problems, especially cost of construction and ADA access.

Figure 2:
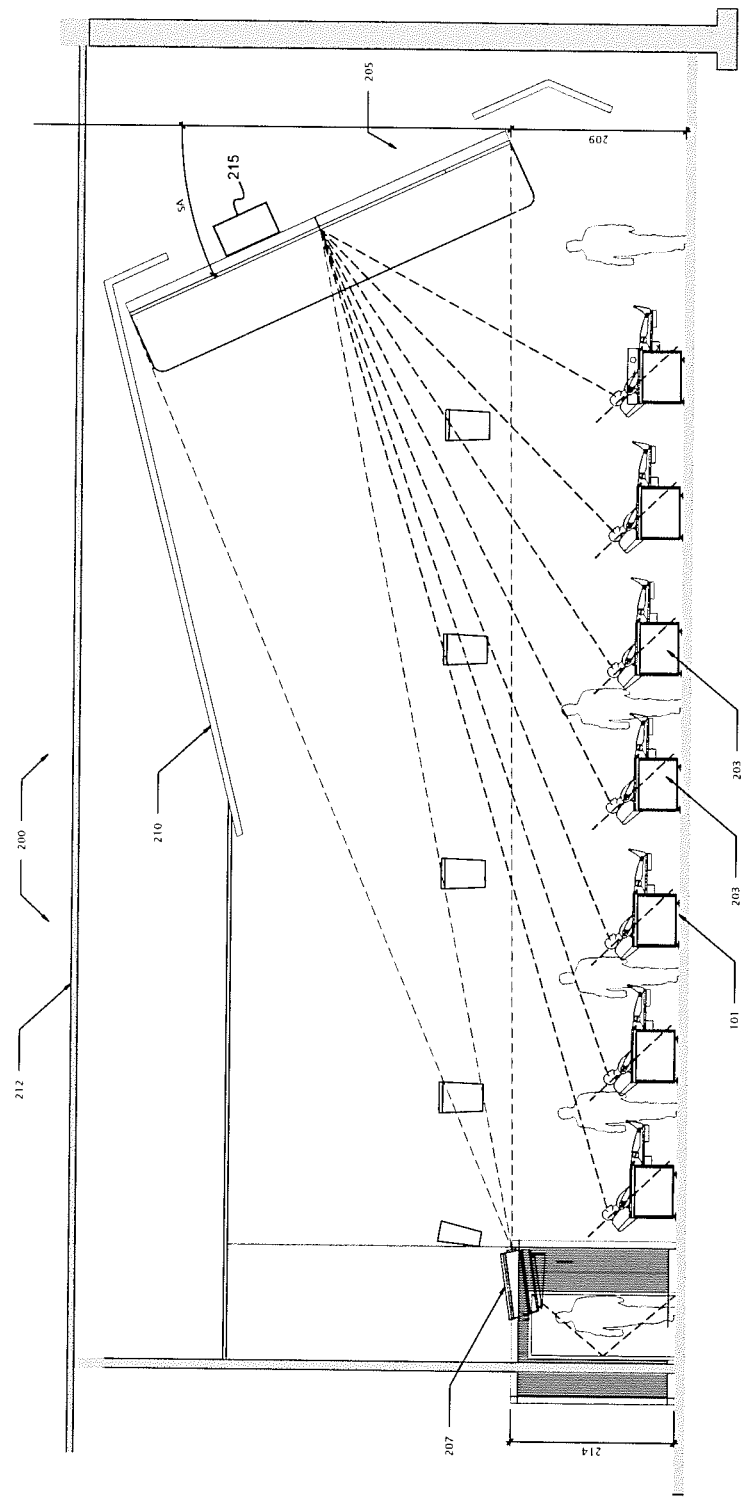
FIG. 2 is an auditorium with a flat floor and a tilted screen.

According to some exemplary embodiments, the problem of achieving clear lines of sight for all audience members in a theater auditorium is solved by an alternative solution to sloped or tiered flooring. Specifically, a flat-floor space for a theater auditorium is combined with an elevated screen that is tilted towards the audience. This configuration, illustrated in FIG. 2, provides clear and unobscured lines of sight for all audience members to all portions of the screen (e.g., very top, middle, and very bottom of the screen). Additionally, the audience viewing angles and screen sight angles can be optimized by varying the screen angle, the elevation of the screen, the recline angle, and the position of the audience seats.

According to the exemplary embodiment illustrated in FIG. 2, a motion picture theater (i.e., cinema) auditorium 200 is provided which includes a seat area with a flat floor 101, a plurality of reclining or reclined seats 203 positioned within the seating area, a tilted motion picture projection screen 205, and a projector 207. In some embodiments, it is preferred that the seats 203 in the seating area are reclining seats with a recline angle from 15 to 70 degrees. This means either an individual seat can assume any recline angle from 15 degrees to 70 degrees or, alternatively, an individual seat is configured to variably assume a subset of angles within the range of 15 to 70 degrees but not necessarily the entire range of 15 to 70 degrees. For instance, some seats may be configured to have a variable recline angle from 15 to 30 degrees, 31 to 45 degrees, 46 to 60 degrees, or 61 to 70 degrees. In some instances, some or all of seats 203 are reclined seats. This means that the seats have a nonzero recline angle but are not necessarily configured to have an adjustable recline angle. That is to say, reclined seats may have a fixed reclined angle (e.g., a specific recline angle the value of which is a specific value between 15 and 70 degrees).

The tilted screen 205 is positioned at a first end of the seating area with the screen tilted such that, with respect to floor directly beneath or ahead of the screen, the floor and screen form an acute angle. More specifically, it is preferred that the screen 205 is tilted with a screen angle of 10 to 35 degrees. FIG. 2 illustrates an exemplary screen angle of 25 degrees. Some embodiments may be configured to only assume a screen angle of 10 to 15 degrees, 16-20 degrees, 21 to 25 degrees, 26 to 30 degrees, or 31 to 35 degrees, depending upon other variables of the cinema auditorium configuration discussed herein. In some embodiments, a mechanism is provided for adjusting the tilt of the screen to any of multiple screen angles (e.g., between 10 degrees and 35 degrees). Such a mechanism is illustrated schematically at 215 in FIG. 2. The mechanism may be manual. Alternatively, the mechanism may be automated.

In some embodiments, the screen 205 is elevated with respect to the floor 101 of the seating area. The screen 205 may have an elevation 209 as small as, for example, 4 feet, 5 feet, 6 feet, 7 feet, or 8 feet. The screen 205 may have an elevation 209 that is as larger as, for example, 5 feet, 6 feet, 7 feet, 8 feet, 9 feet, 10 feet, 11 feet, 12 feet, or higher than 12 feet. These exemplary lower and upper limits are subject to any combination to form exemplary screen height ranges, for example 4 to 8 feet, 4 to 12 feet, 8 to 12 feet, or 8 to 9 feet above the floor 101 of the seating area. The elevation 209 is measured from the floor 101 to the bottommost edge of the screen 205, as illustrated in FIG. 2.

The projector 207 is preferably arranged at a second end of the seating area opposite the first end. In many cases, the first end of the seating area can be regarded as the "front" of the auditorium, and the second end of the seating area can be regarded as the "back" of the auditorium. Arranging the projector 207 at the second end of the seating area has the effect that all of the seats 203 are arranged in the space between the projector 207 and the screen 205. All of the seats are arranged closer to the screen 205 than is the projector 207. Said another way, no seats are arranged behind the projector 207, including directly behind the projector 207 as well as behind to either side. Arranging or positioning the projector 207 at the second end of the seating area behind all of the reclining or reclined seats is of particular consequence for auditoriums which have a flat floor. With a flat floor arrangement, a projector closer to the first end than one or more seats would undesirably obscure the lines of sight to parts of the screen 205 for the one or more seats in question. It is possible to suspend a projector from a ceiling in order to place it closer to the screen and yet not obscure the lines of sight from some of the seats at the back of the auditorium. However, this configuration has greater costs (e.g., installation, maintenance, replacement, etc.) as compared to a projector the support for which is the same flat floor 101 as the multitude of seats 203.

Figure 16:
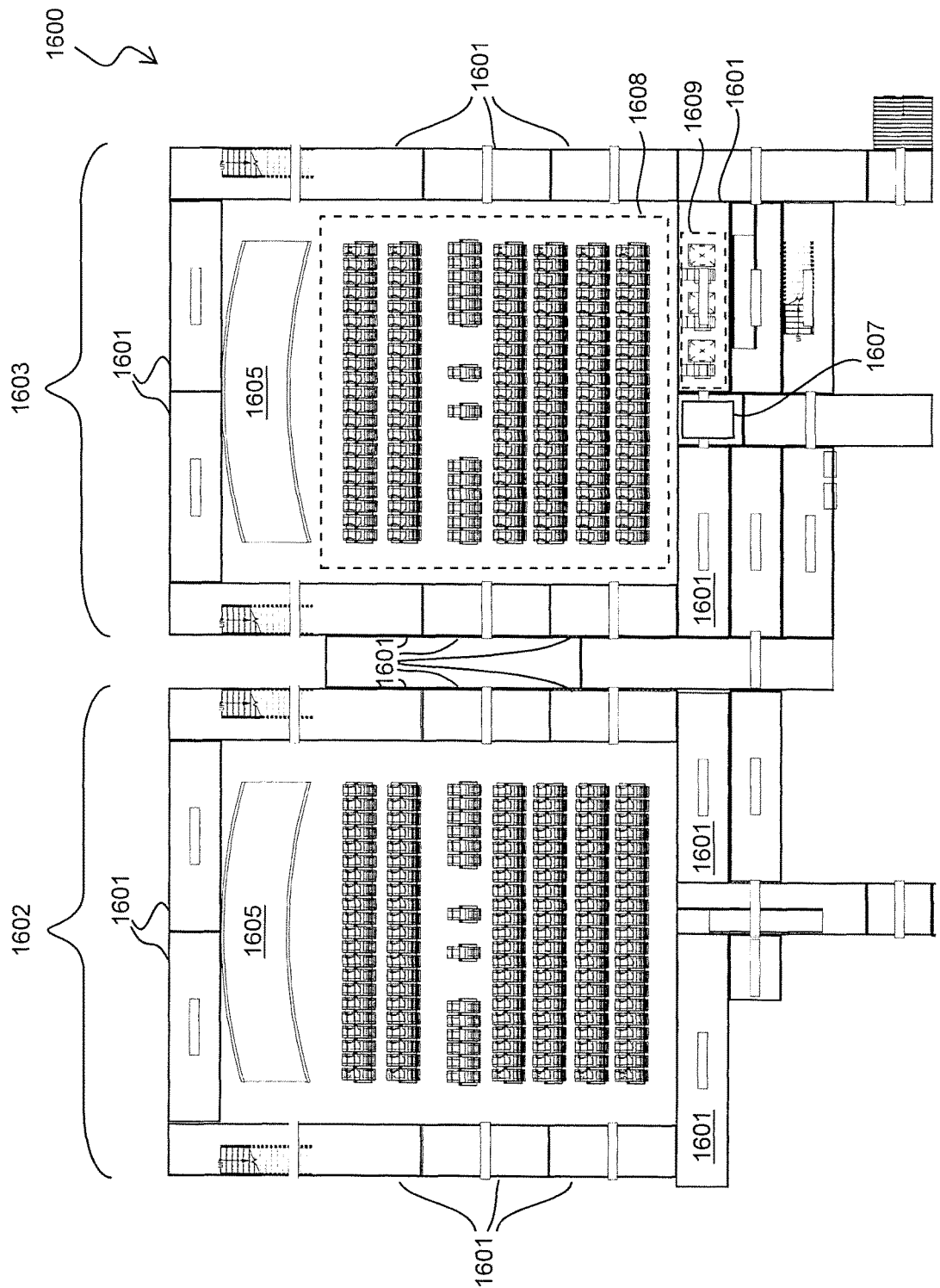
FIG. 16 is a plan view showing a pair of auditoriums each with a main seating area and, additionally, a VIP seating area.

It should be appreciated that while many exemplary embodiments discussed herein refer to "seating area" and "auditorium" in the singular, these and other embodiments may further include additional distinct seating areas and/or auditoriums which make use of the same projector and screen. For instance, FIG. 16 shows an auditorium 1603 that includes, in addition to a main seating area 1608, an additional seating area 1609. One or more additional seating areas may be added to any embodiment disclosed herein, if desired. The secondary seating area may be, for example, a so called "VIP seating area" with limited seats offered at a premium for one or more of improved comfort or ergonomics, additional personal space, etc. VIP seating areas are in some ways comparable to box seats at stadiums or performing arts venues. An additional seating area such as a VIP seating area is distinguishable from the rows of seats belonging to the main seating area by one or more of, for example, physical partitions such as windows, separate access such as dedicated stairwells and hallways, unique seat elevation such as on a second floor, etc. Additional seating areas may be positioned alongside, above, or even behind the projector, while the main seating area is preferably arranged entirely in front of the projector (i.e., between the projector and screen).

As can be appreciated by a comparison of projector 107 in FIG. 1 and projector 207 in FIG. 2, projector 207 according to some exemplary embodiments herein is supported on the same level (e.g., ground level) as the seating area of the auditorium. Advantageously, a second floor or level 102 is not required, saving both space and costs associated with establishing and maintaining the cinema auditorium. The projector 207 may be elevated to a height 214 by a structural support arranged on the floor 101.

The distance between the first end and the second end of the seating area is variable, depending on the desired size of the auditorium. Small auditoriums may be, for example, 20 to 30 feet in width and 25 to 50 feet in length with an accompanying screen width of 15 to 30 feet. Medium auditoriums may be, for example, 25 to 40 feet in width and 35 to 65 feet in length with a screen width of 20 to 40 feet. Large auditoriums may be, for example, 35 to 60 feet in width and 55 to 90 feet in length with a screen width of 25 to 60 feet.

The distance from the projector lens to the center point of the screen is, for example, 15 to 80 feet for indoor seating areas. Meaning, for specific exemplary embodiments, this distance may be at least 15 feet, at least 20 feet, at least 30 feet, at least 40 feet, at least 50 feet, at least 60 feet, or at least 70 feet, up to 80 feet or more. For outdoor seating areas, the distance from the projector lens to the center point of the screen is larger, for example at least 100 or 200 feet. In general, for both indoor and outdoor spaces, the distance between the two ends of the seating area will be between 15 and 200 feet (e.g., at least 70 feet, 80 feet, or 90 feet and up). The distance between the two ends of the seating area is approximately the same (e.g., within 10 feet of) the distance from the projector lens to the center point of the screen in many embodiments. In many embodiments, the auditorium size substantially corresponds to the seating area size, as most (e.g., more than 85%, 90%, or 95%) of the auditorium's length and width are used to fit seats in order to maximize the number of available seats in the auditorium. In some embodiments, the projector is positioned to angle upwardly with respect the seating area for projecting images onto the screen 205. Angling the projector (e.g., upwards) toward the center of the screen is advantageous to improve the appearance and optical effects of the projected image or film. Optimally, the screen is perpendicular to the projected images. Depth of field consistency (which affects image quality, specifically clarity related to focus) and brightness are optimized and the most consistent for all viewers (e.g., viewers in the front of the auditorium vs viewers in the back) when the projected light path of the images is perpendicular to the screen. In continued reference to FIG. 2, auditorium 200 further comprises a ceiling 210 which is present in some embodiments of the invention. The ceiling 210 is positioned above at least a portion of the seating area up to an entirety of the seating area. The ceiling 210 is sloped or stepped upwards from the second end of the seating area toward the first end. In other words, the ceiling 210 slopes or steps upward from the rear of the auditorium 200 toward the front of the auditorium 200. In many embodiments, the ceiling 210 is a drop ceiling arranged below the primary structural ceiling 212. This is especially true for embodiments which provide a cinema auditorium in a repurposed warehouse space, the primary structural ceilings of which generally form level plans. A ceiling 210 serves multiple purposes. One purpose is to provide a streamlined and immersive viewing space in which the slope of the ceiling is more closely parallel with the lines of sight of audience members, at least as compared with substantially level ceilings like ceiling 212 in FIG. 2. This improves the viewing experience for the audience. In addition, a sloped ceiling 210 can provide improved acoustics for the audience members and reduce light dispersion from the screen 205 which would otherwise occur in the higher volume of indoor space determined by the primary structural ceiling 212.

Exemplary embodiments as discussed above with a flat floor seating area provide ADA patrons full access to the entire auditorium, in contrast to being constrained to a handful of locations, which is a common challenge with sloped floors and tiered floors (which have staircases). Compared to sloped floor or tiered floor configurations, the construction cost of a flat floor auditorium is also significantly lower. Additionally, a flat floor provides the landowner with a more flexible building, reducing single-use facility risk and making the investment more attractive in the event the real estate is re-purposed or renovated.

Sloped Floor Configuration

Before the prolific construction of auditoriums for movie theaters, sloped floors were the predominant building configuration for movie theaters. As they have aged, many sloped floor facilities have been shuttered or torn down, only to be replaced with modern stadium seating style movie theaters.

Figure 3:
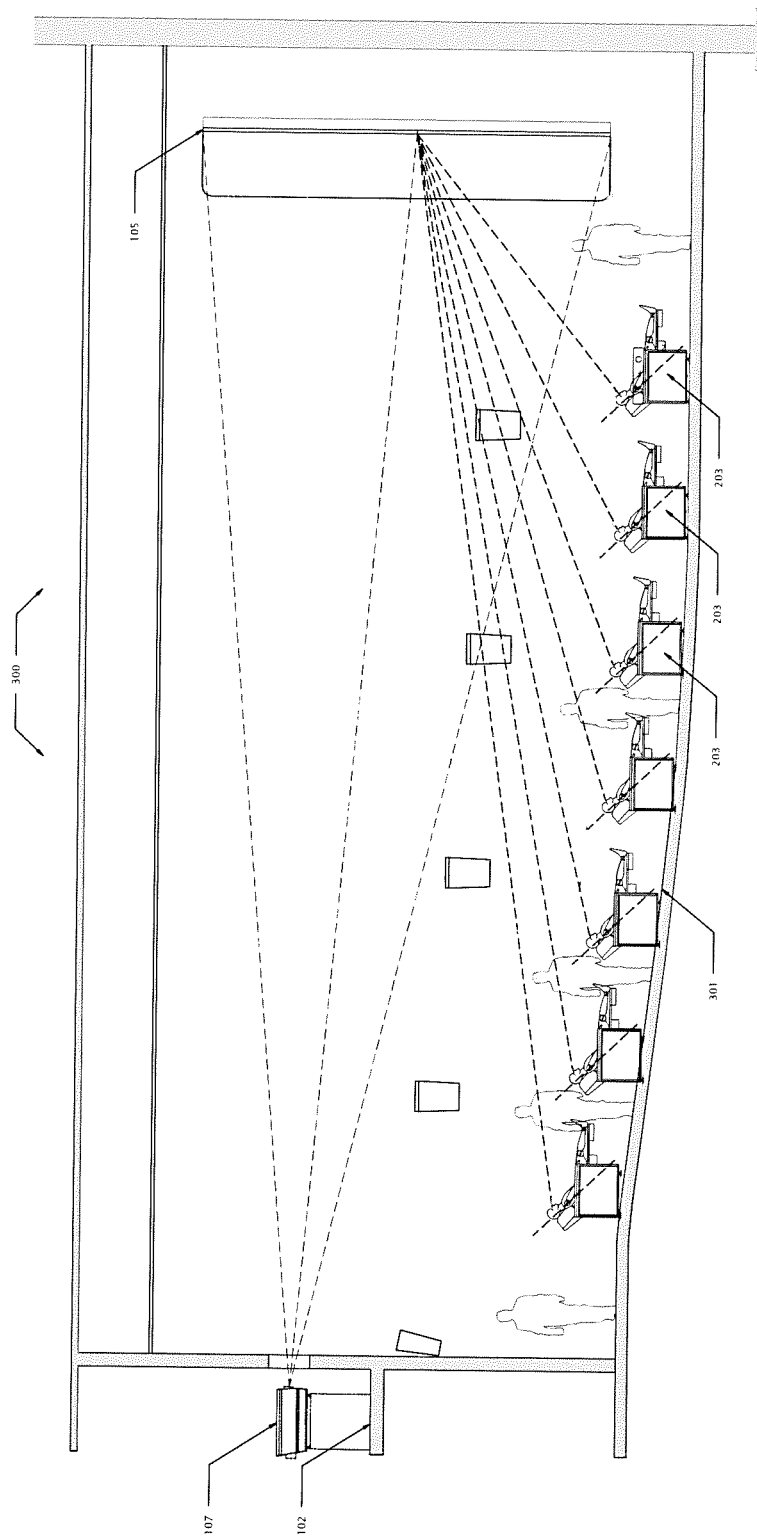
FIG. 3 is an auditorium with a sloped floor and a vertical screen.

To be competitive, many exhibitors are introducing premium reclining seating in their existing sloped floor facilities. However, while installing reclining or reclined seats introduces a comfortable consumer seating experience, it degrades the ergonomic viewing angles and screen sight angles. FIG. 3 exemplifies this problem. The example auditorium 300 has a sloped floor 301 combined with reclining or reclined seats 203. Lines of sight for audience members in seven seats 203 are depicted for viewing the topmost, center, and bottommost points on the screen, respectively. The substantial recline angles of the seats 203 combined with the vertical screen 105 result in an uncomfortable viewing experience.

Figure 4:
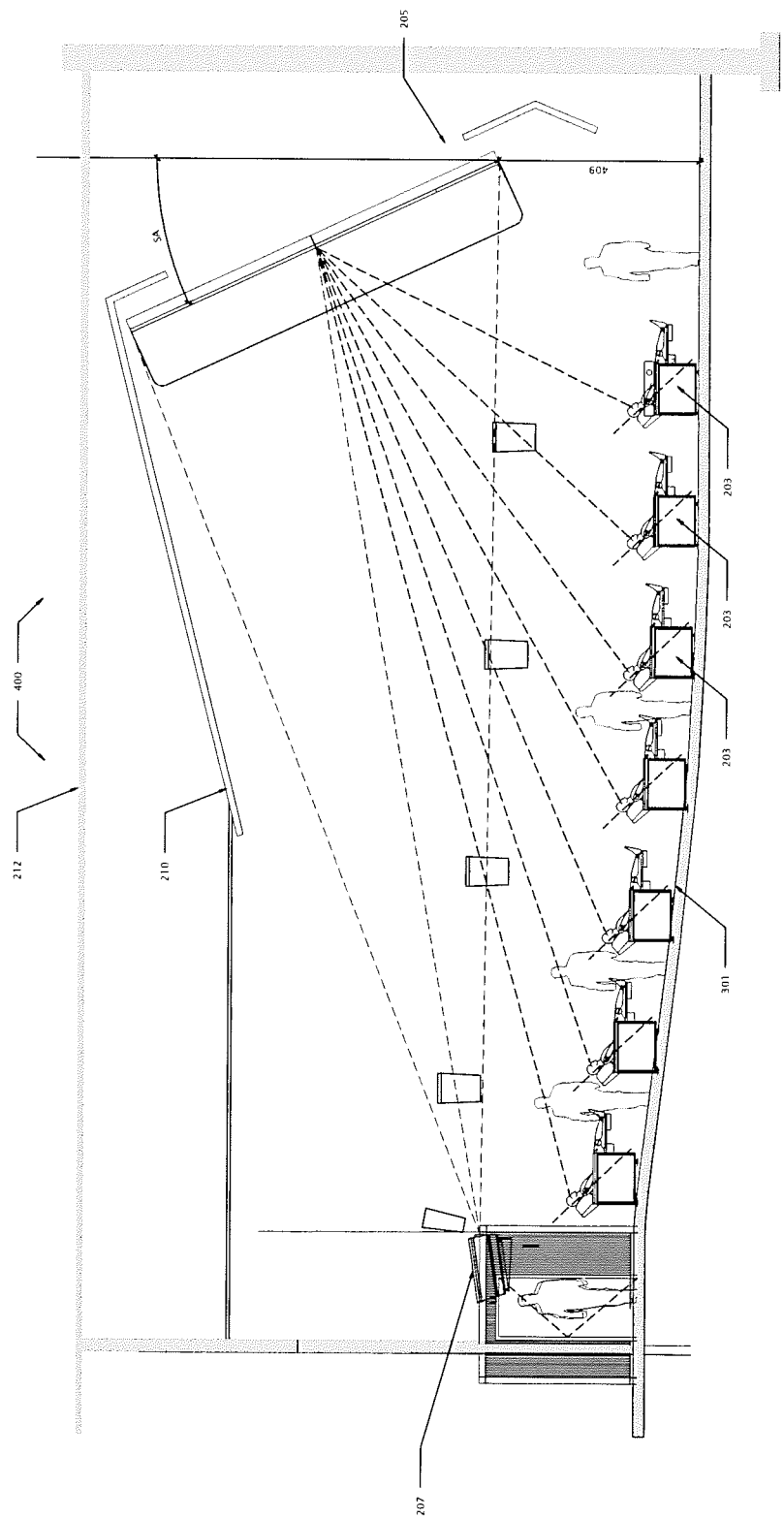
FIG. 4 is an auditorium with a sloped floor and a tilted screen.

According to some exemplary embodiments, the solution to the less-than-optimal configuration depicted in FIG. 3 is to raise and/or tilt the screen toward the viewing audience, improving lines of sight, audience viewing angles, and screen sight angles, as depicted in FIG. 4, for example.

FIG. 4 shows a movie theater auditorium 400 which includes a sloped floor 301, reclining or reclined seats 203, and a tilted screen 205. As with embodiments described in connection with FIG. 2, an exemplary screen angle is 10 to 35 degrees, for example. FIG. 4 illustrates an exact screen angle of 25 degrees. The screen 205 is elevated with respect to the first end of the sloped floor 301 of the seating area. The screen 205 may have an elevation 409 as small as, for example, 4 feet, 5 feet, 6 feet, 7 feet, or 8 feet. The screen 205 may have an elevation 409 that is as large as, for example, 5 feet, 6, feet, 7 feet, 8 feet, 9 feet, 10 feet, 11 feet, 12 feet, or higher than 12 feet. These exemplary lower and upper limits are subject to any combination to form exemplary screen height ranges, for example 4 to 8 feet, 4 to 12 feet, 8 to 12 feet, or 8 to 9 feet above the floor 301 of the seating area, for example. The elevation 409 is measured from the floor 301 at the first end of the seating area to the bottommost edge of the screen 205, as illustrated in FIG. 4. The projector 207 may be tilted upward for aligning with the elevated and tilted screen 205, as was the case in FIG. 2.

The auditorium 400 of FIG. 4 includes a ceiling 210 below a primary structural ceiling 212. As implied by the like reference numbers, both ceilings are substantially as described above in connection with FIG. 2.

The end result is the re-use of a facility that is considered obsolete, renovating it into a modern, competitive product at a reduced market entry price. This allows exhibitors with older facilities a competitive platform on which they can compete with more modern facilities.

Tiered Floor Configuration

Figure 5:
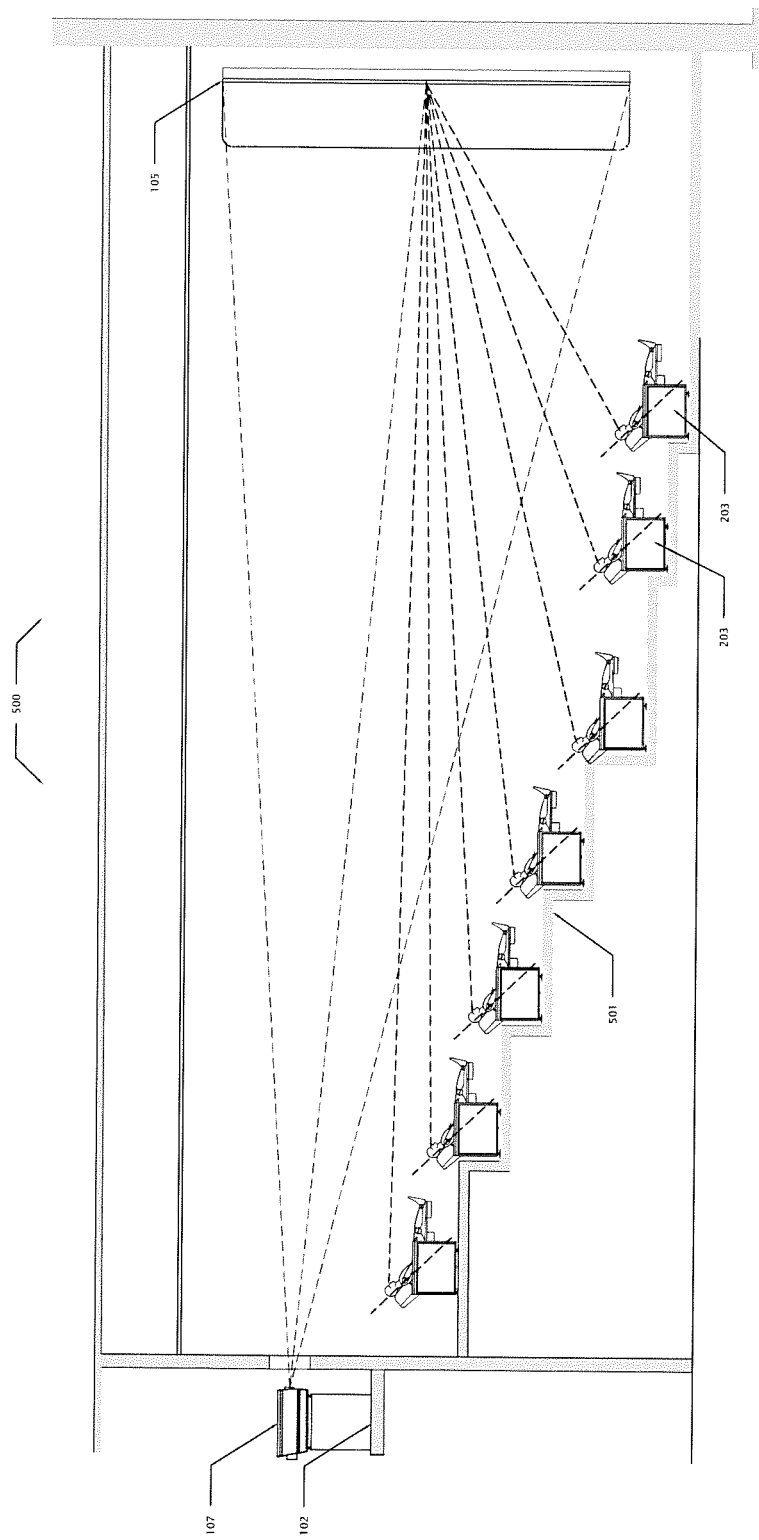
FIG. 5 is an auditorium with a tiered floor/stadium seat configuration and a vertical screen.

By a large margin, stadium seating has been the preferred floor/seating configuration of modern movie theaters for the last 20 years. Stadium seating is also the least compatible arrangement for reclining seating, which is quickly sweeping through the industry. Specifically, when reclining or reclined seats are placed into a stadium seating configuration, audience viewing angles have the potential to be anything from less-than-optimal to unacceptable, as depicted by FIG. 5. FIG. 5 shows a cinema auditorium 500 with a tiered floor 501, reclining or reclined seats 203, and a vertical screen 105. In this arrangement, it is not uncommon for audience viewing angles to be as shallow as 35 degrees. This contrasts sharply with the optimal audience viewing angle of 80 degrees, as discussed above.

Figure 6:
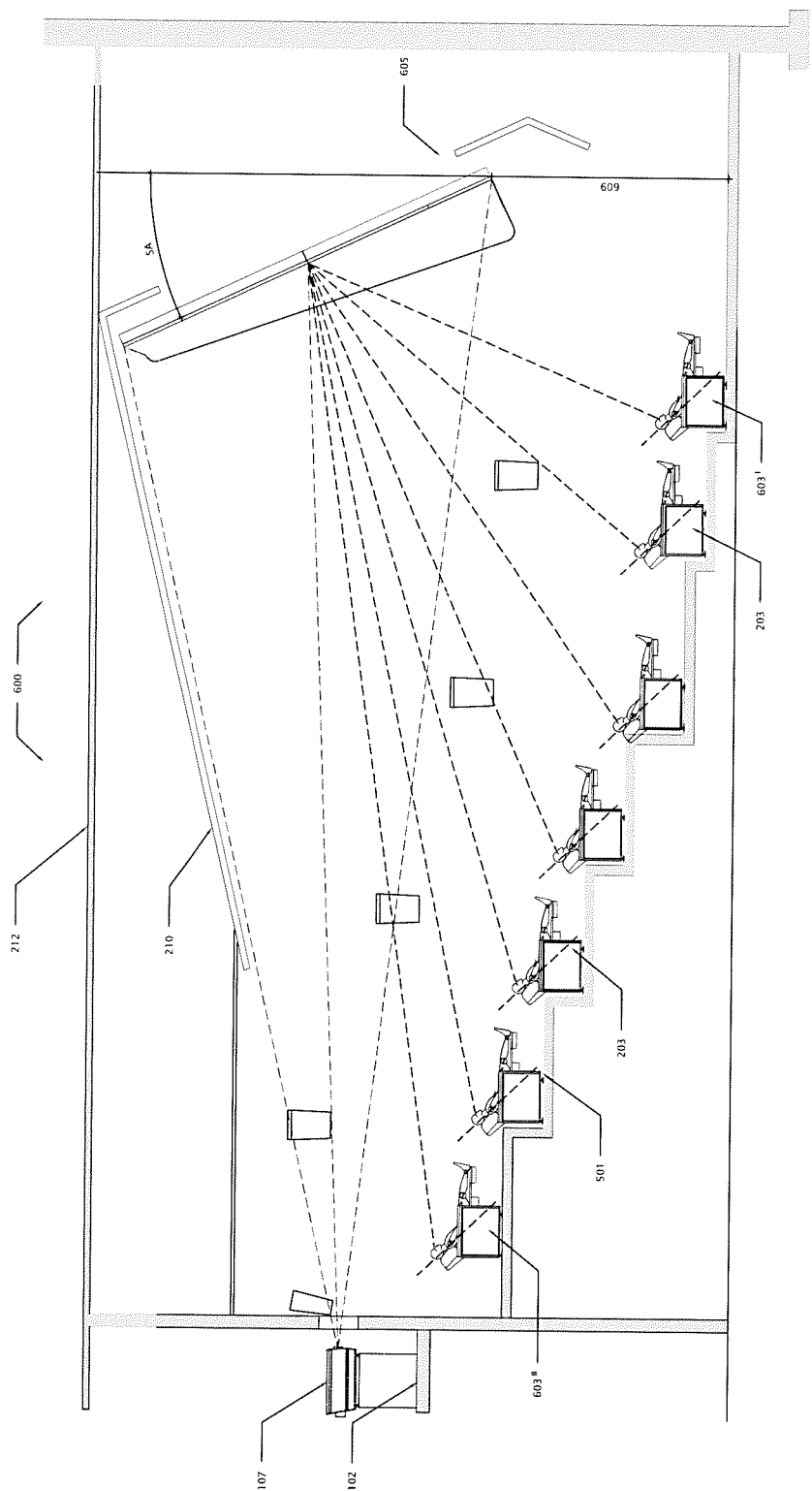
FIG. 6 is an auditorium with a tiered floor and a tilted screen.

FIG. 6 illustrates a solution to the problem of combining a tiered floor 501 conventional for stadium seating with reclining or reclined seats 203. Specifically, a cinema auditorium 600 includes a tiered floor 501 for the seating area, reclining or reclined seats 203 arranged in the seating area, and, significantly, a raised and tilted screen 605 which tilts toward the audience with a positive screen angle. The screen angle may be, for example, 10 to 35 degrees. By way of example, FIG. 6 illustrates a specific screen angle of 25 degrees. The screen elevation 609 is generally greater the elevations 209 and 409 as discussed in relation to FIGS. 2 and 3 to accommodate the substantially greater seat elevation differential between the lowest seat 603' in the auditorium and the highest seat 603" in the auditorium. As evidenced by the example lines of sight and center bodylines illustrated in FIG. 6, audience viewing angles improve dramatically as compared to vertical screen configurations such as in the auditorium 500 in FIG. 5.

The auditorium 600 of FIG. 6 includes a ceiling 210 below a primary structural ceiling 212. As implied by the like reference numbers, both ceilings are substantially as described above in connection with FIG. 2.

In a new-construction scenario, the architect/exhibitor is able to implement stadium seating (which the public still considers premium) that is reclined and simultaneously provide an optimal viewing experience. The end result is an immersive experience with reclining or reclined seats in a tiered stadium seating configuration, with optimal lines of sight and audience viewing angles.

Outdoor Configuration

Further embodiments are drawn to improved outdoor movie venues and equipment. Outdoor screens (also sometimes referred to as exterior screens) are used in drive-in movie theaters and open air cinemas.

Figure 7:
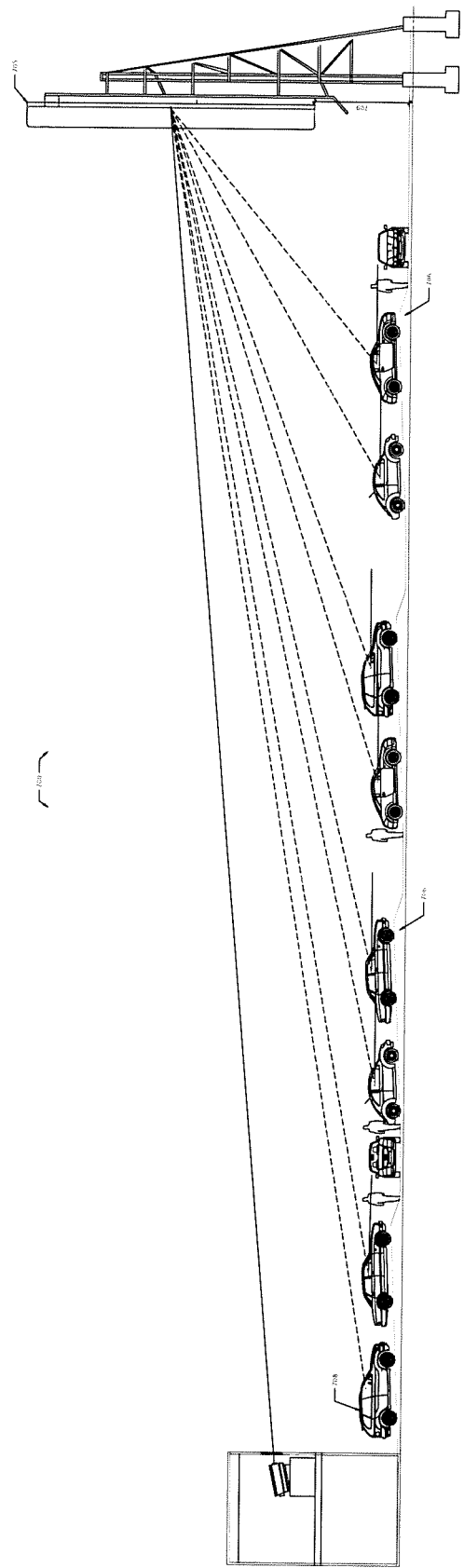
FIG. 7 is an outdoor motion picture viewing space with a vertical screen and sloped vehicle ramps.

FIG. 7 shows a drive-in movie theater 700. Traditionally, an outdoor screen for a drive-in movie theater is a purpose-built facility with a vertical screen 705. Construction costs are larger, requiring significant site development to create rows of inclined pads or ramps 706 for cars 708 to park on. Exemplary angles for the pads/ramps 706, and thus the angle of the cars parked thereon, are 0 to 15 degrees. A drawback of this is the same as a purpose-built building; the ground is essentially single-use, making it ill-suited for other functions.

Figure 8:
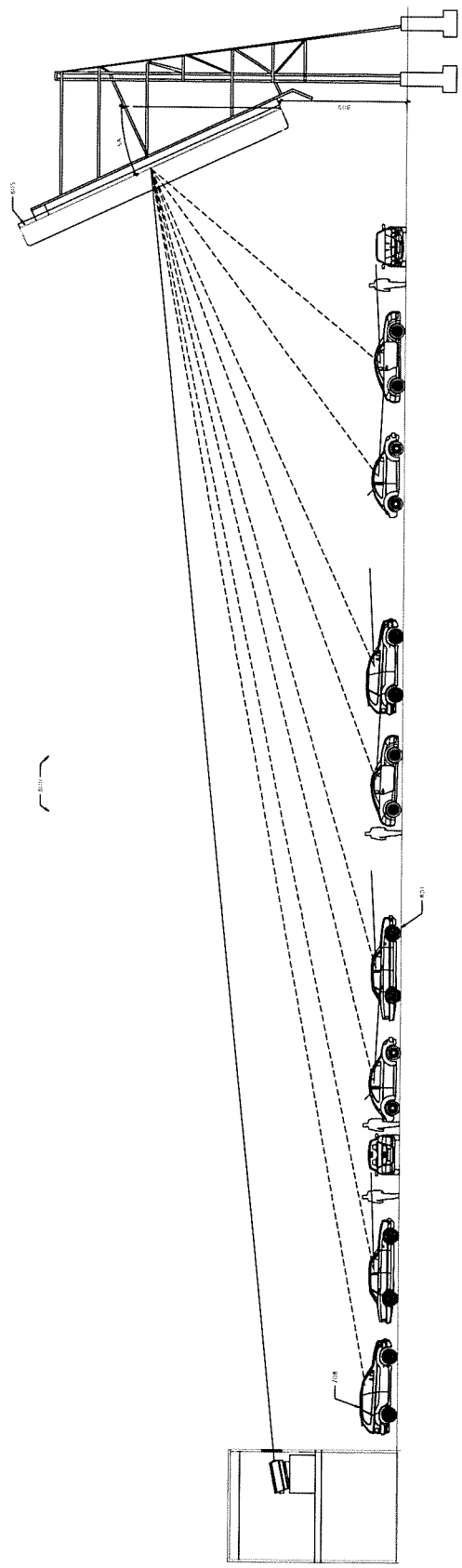
FIG. 8 is an outdoor motion picture viewing space with a tilted screen and flat viewing surface.

FIG. 8 shows an advantageous configuration according to some embodiments. In contrast to theater 700 depicted in FIG. 7, the drive-in movie theater 800 has a tilted screen 805 with a positive screen angle towards the audience. In some embodiments, it is also desirable to elevate the screen to a higher elevation 809 as compared to the elevation 709 used for conventional vertical screens 705 (see FIG. 7). By tilting or tilting/elevating the screen 805 toward the audience, vehicles may be parked on a flat surface 801, eliminating the need for a purpose built facility. By doing so, the construction cost of a drive-in movie theater is reduced and the flexibility of the facility increases significantly. For the property owner, this means that open space can be used for other purposes, increasing inherent land value.

Figure 9:
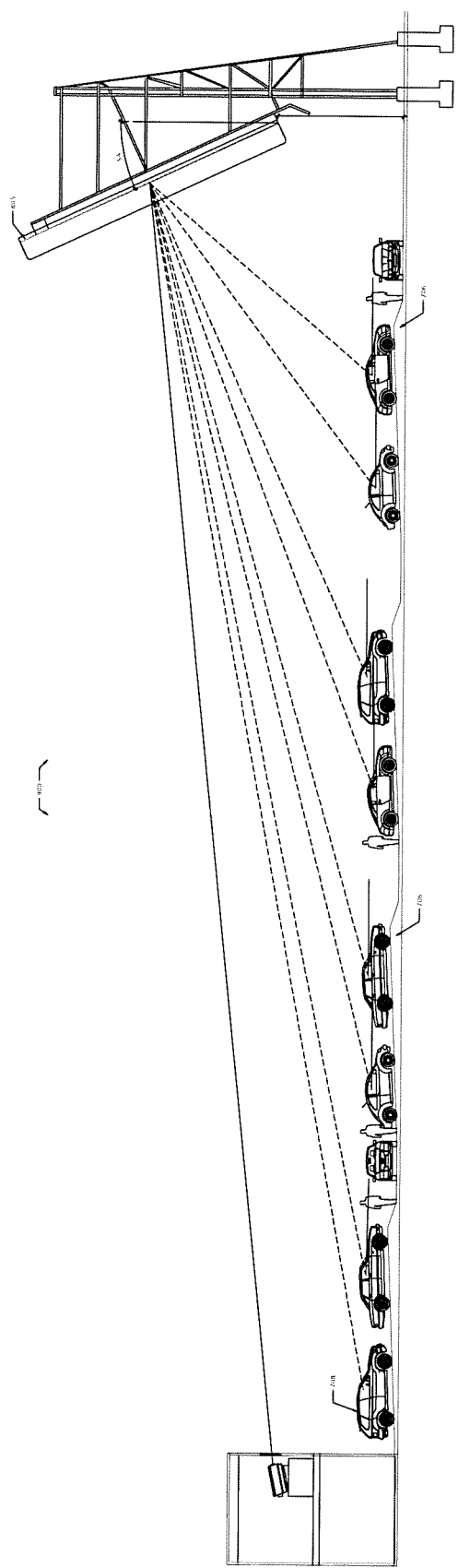
FIG. 9 is an outdoor motion picture viewing space with a titled screen and sloped vehicle ramps.

Similar to sloped floor facilities discussed in connection with FIGS. 3 and 4, retrofitting an existing property is also made possible by embodiments drawn to outdoor screens. FIG. 9 shows an outdoor movie theater 900 that includes a combination of pads or ramps 706, as were discussed above in connection with FIG. 7, and a tilted or tilted/elevated screen 805 as discussed above in connection with FIG. 8. An outdoor movie theater 900 is especially advantageous as a retrofit in that it improves the viewing experience of patrons by improving screen sight angles and audience viewing angles without any required changes to the parking area for the cars 708.

Applying embodiments for outdoor screens allows an architect/designer to custom-suit the degree of tilt of the screen to best accommodate the viewing audience. Drive-in arrangements are typically larger than interior auditoriums and in some cases require a shallower screen angle. For example, the screen angle of an outdoor screen may have a lower limit of 5 degrees, 6 degrees, 7 degrees, 8 degrees, or 9 degrees. The screen angle of outdoor screens may have an upper limit of, for example, 25 degrees, 24 degrees, 23 degrees, 22 degrees, 21 degrees, 20 degrees, 19 degrees, 18 degrees, 17 degrees, or 16 degrees. These upper and lower limits are subject to any combination to form exemplary screen angle ranges for outdoor screens (e.g., 5 to 20 degrees). In some embodiments the screen angle is fixed at a particular value in the recited range. Alternatively, a particular screen may have a variable screen angle to assume different values in the recited range.

Figure 14:
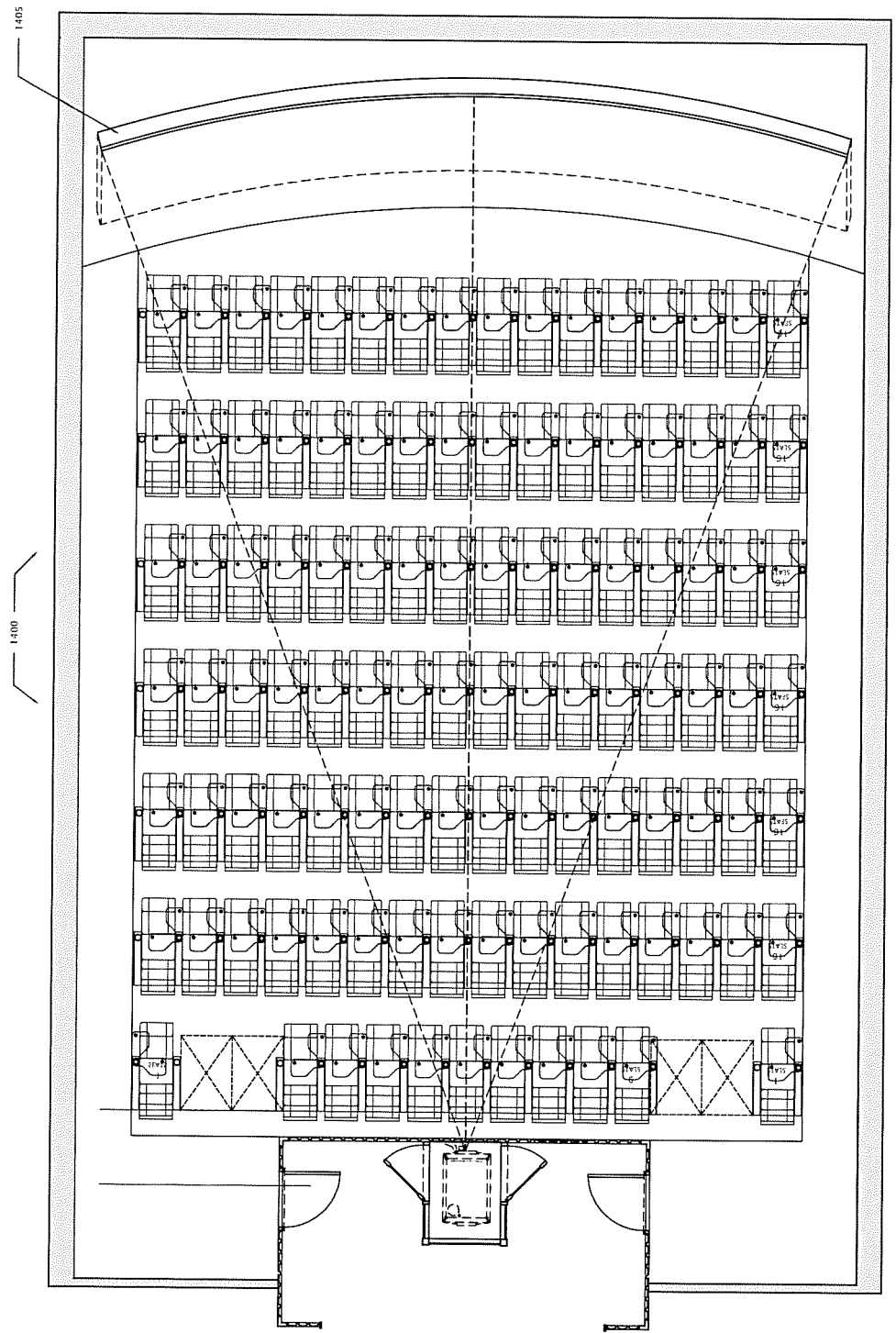
FIG. 14 is an auditorium plan view showing multiple rows and a curved screen configuration.

It should be appreciated that embodiments of the invention including each of the exemplary embodiments discussed herein are suited for both flat screens as well as curved screens. FIG. 14, for example, shows a top plan view of an auditorium 1400 which includes a curved screen 1405. The solid lines of screen 1405 show the bottom edge of the screen (the edge closest to the ground). The broken lines of screen 1405 show the top edge of the screen (the edge furthest from the ground). From the illustrated plan view it is apparent the top edge of the screen is closer to the audience in the geometric plane of the plan view than is the bottom edge. In other words, the screen 1405 is tilted toward the audience.

Figure 15:
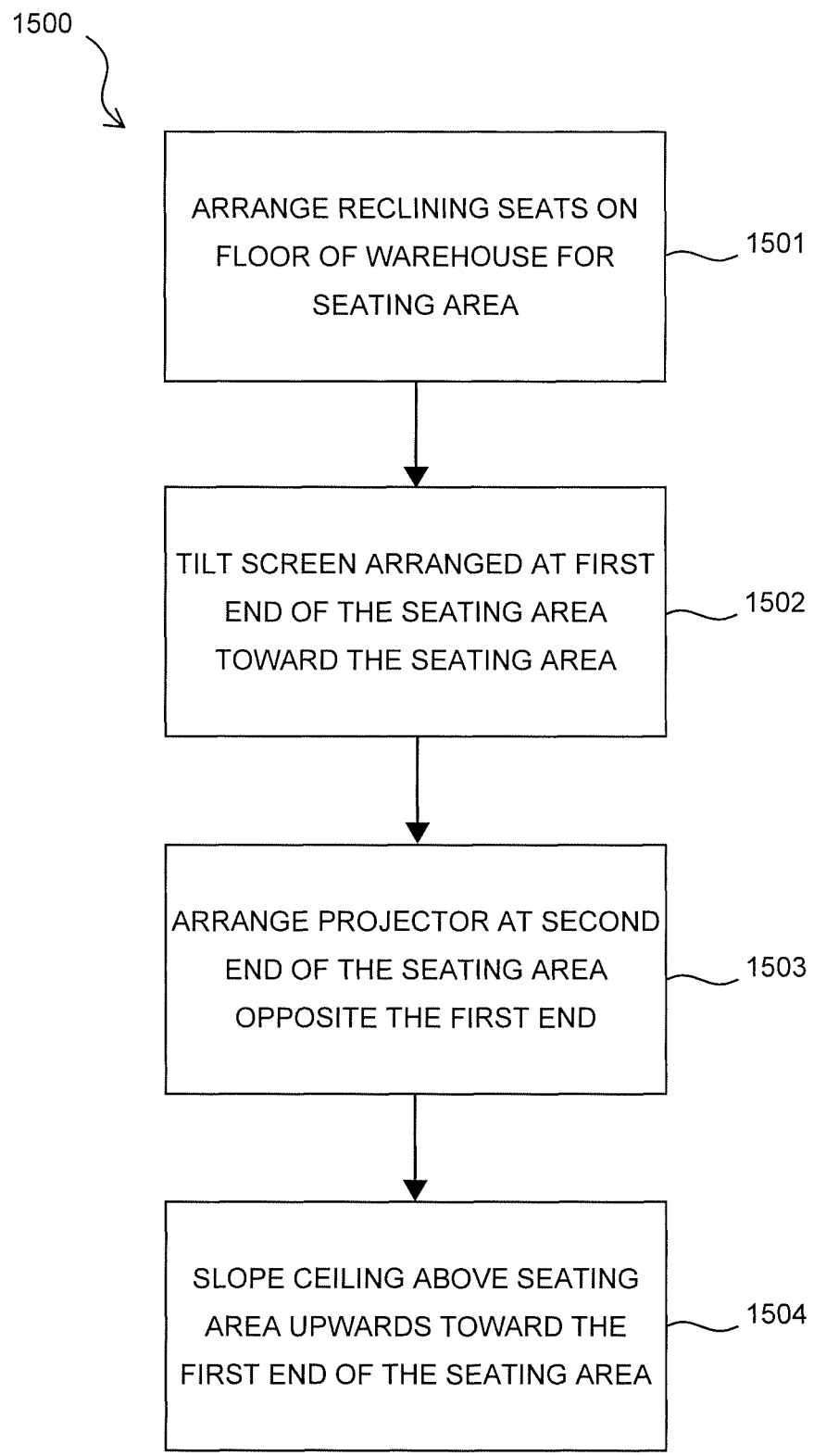
FIG. 15 is a method of providing a cinema auditorium in a warehouse space.

FIG. 15 shows a method 1500 of providing a cinema auditorium in a warehouse space. At block 1501, a plurality of reclining or reclined seats are arranged on a flat floor area in the warehouse space to create a seating area. This will entail, for example, securing (e.g., by bolting) the seats to a concrete, wood, metal, or carpeted floor to form several consecutive rows. The seating area produced by the arrangement of the seats has a generally quadrilateral shape by default. However, rows may be straight or curved and different rows may have different numbers of seats as compared to other rows, e.g., a row ahead or a row behind. At block 1502, a motion picture projection screen is arranged at a first end of the seating area and tilted toward the seating area with a screen angle of 10 to 35 degrees, for example. At block 1503, a projector is arranged or placed at a second end of the seating area opposite the first end. In some embodiments, it is preferable that the projector is angled upwardly with respect to the seating area for projecting images onto the tilted motion picture projection screen. Block 1504 illustrates an additional step which is implemented for some but not necessarily all embodiments. At block 1504, at least a portion of ceiling above the seating area is sloped upwards toward the first end. While blocks 1501 through 1504 are illustrated sequentially in FIG. 15, it should be appreciated that the various steps may be performed in any order. Some or all of the steps may also be conducted simultaneously. Cinema auditorium 200 of FIG. 2 is an exemplary product of method 1500.

Figure 17:
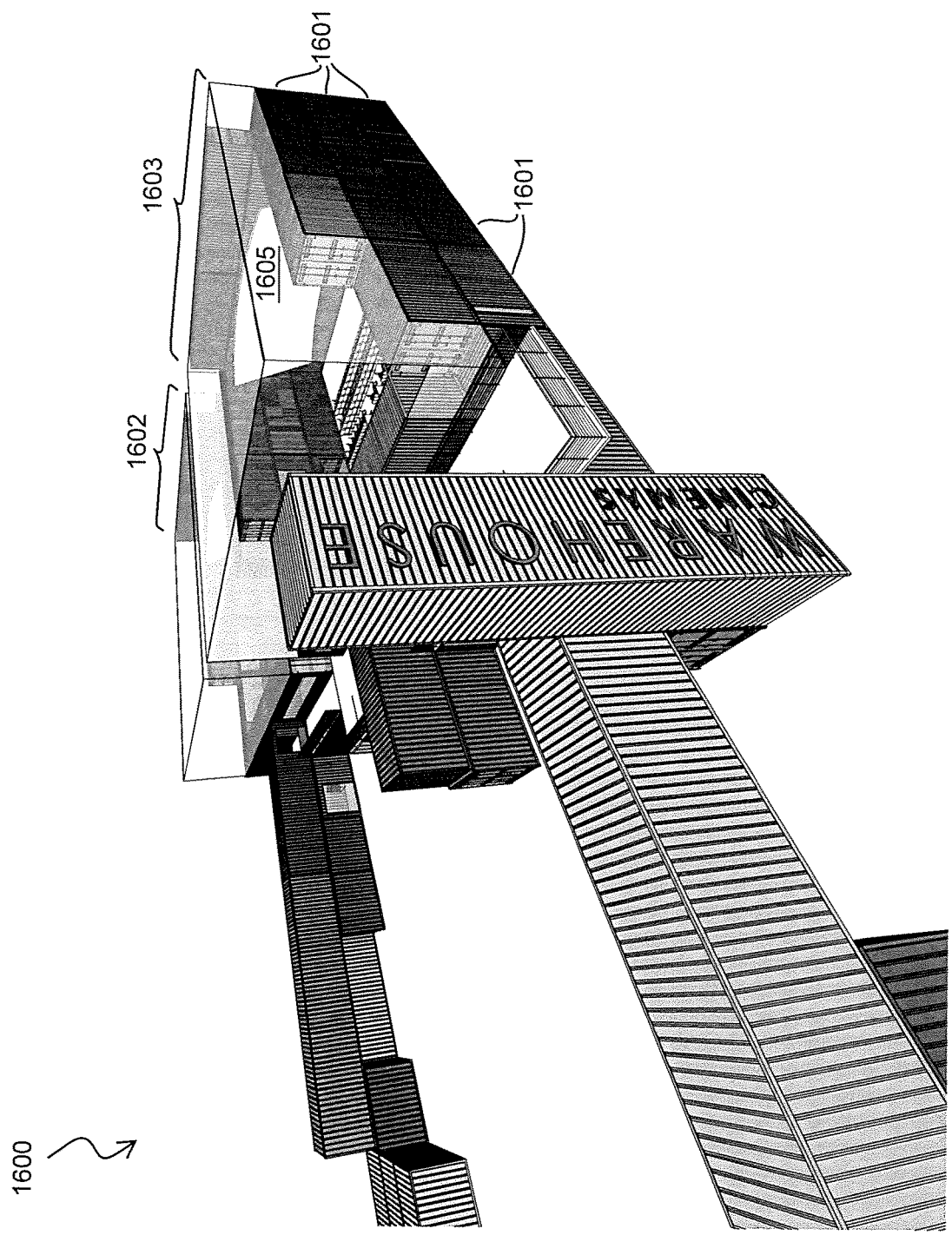
FIG. 17 is a perspective view of a pair of auditoriums the walls of which are repurposed shipping containers.

FIGS. 16 and 17 illustrate exemplary cinema auditoriums the walls of which are an arrangement of repurposed shipping containers. FIG. 17 shows ceilings/roofing and portions of walls removed to permit a view of otherwise obstructed features (e.g., indoor elements). A shipping container, as implied by the name and in accordance with the conventional use of the term, is a container designed and manufactured for an intended use of storing, transporting, and handling contents temporarily placed inside the container. Shipping containers are sometimes referred to as intermodal containers, freight containers, dry freight containers, general purpose containers, intermodal freight containers, sea containers, simply "container", or other names in the shipping, handling, and transportation industry. Shipping containers are generally made of corrugated metal (e.g., steel, weathering steel such as COR-TEN® steel, etc.) and have an overall geometric configuration of a rectangular prism or "closed box". Shipping containers are commonly seen on ships, trains, and trucks. Although a variety of different sizes exists, several standardized sizes are common around the world. Basic dimensions of intermodal containers are largely determined by ISO standards such as ISO 668:2013 and ISO 1496-1:2013. ISO 6346 provides an international standard for coding, identification, and marking of the most common (intermodal) shipping containers. Two of the most common standard lengths for shipping containers are 20 feet and 40 feet. Other lengths include 10 feet, 30 feet, 45 feet, 48 feet, and 53 feet. Containers can be as short as 8 feet, in which case the shape of the container may appear a square prism. A standard width is 8 feet, and a standard height is 8.5 feet. So called "high cube" or "hi-cube" containers are slightly taller, with a standard height of 9.5 feet. Shipping containers are deliberately configured to easily stack for shipping purposes, even in circumstances where two stacked shipping containers have different lengths. Embodiments of the invention may employ any one or more of these standard or non-standard sizes.

Shipping containers are generally usable for several years to over a decade depending on the extent of corrosion and damage from weather and use, replacement costs, and similar considerations. After a shipping container is retired from use for storage and transportation of goods, it may be discarded or recycled as waste. Some embodiments of the invention advantageously put such older shipping containers to new uses.

FIGS. 16 and 17 shows a cinema 1600 which includes shipping containers 1601 that have been repurposed for use as building elements, especially walls, to cinema auditoriums 1602 and 1603. "Repurposed" as used herein means configured for a use different from the original or intended use. While shipping containers have an original or intended use of storage or transportation of goods temporarily arranged within the shipping containers, repurposed shipping containers according to FIGS. 16/17 and other embodiments are configured together such that they are usable and used to form structural walls for a building such as a cinema auditorium. Buildings such as cinema 1600 with walls comprising or consisting of shipping containers 1601 are permanent structures, meaning the shipping containers 1601 are permanent structural elements as well. Alternatively, the building structures and/or shipping containers may be temporary structures in some embodiments.

A cinema auditorium such as auditorium 1602 or 1603 includes one or more walls comprising or consisting of a plurality of stacked repurposed shipping containers 1601, a motion picture projection screen 1605 associated with the one or more walls, and a projector 1607 for projecting images onto the motion picture projection screen 1605. The screen 1605 may be, for example, free standing adjacent to one of the walls or, alternatively, mounted to one or more of the shipping containers 1601 of a wall. For an indoor auditorium, the screen 1605 can be arranged inside the space enclosed by the shipping containers.

The exemplary auditoriums 1602 and 1603 each have four primary walls all of which consist of or consist primarily of stacked shipping containers. Alternative rooms or buildings may have just three walls or more than four walls (e.g., five, six, etc.) any number of which comprise or consist of stacked shipping containers. The combined shipping containers collectively enclose the indoor space of the auditorium. The indoor space includes the main seating area 1608. The enclosure of the indoor space by the shipping containers permits the indoor space to be climate controlled, a desirable feature for many cinema customers. The stacked and abutted shipping containers 1601 are connectable via pre-existing connection means common to shipping containers. Ordinarily, connection is achieved using a locking cam mechanism which connects two shipping containers at their corners, be the shipping containers vertically adjacent, end-to-end, or side-by-side. Other connections means such as welding are also possible.

Most if not all of the shipping containers 1601 are intact, meaning they have all six original sides. However, a small number of the shipping container 1601 may have an opening such as doorway cut through one or two sides.

In some embodiments, the shipping containers 1601 are configured to contain purpose-built acoustic and/or thermal insulation. Acoustic and/or thermal insulation may also be fixed or applied to exterior surfaces of the shipping containers. The insulation provides the cinema auditoriums with sound attenuated walls. The open air space within the shipping containers 1601 also contributes to the insular properties of the shipping container walls. An example of a purpose-built insulation is open-cell spray foam insulation applied to interior or exterior surfaces of one or more of the shipping containers 1601. Another example is hanging sound attenuation panels.

While certain exemplary features have been described with reference to specific exemplary embodiments and figures disclosed herein, it should be appreciated that various features of different exemplary embodiments discussed herein may be applied to other embodiments in the practice of the invention.

While exemplary embodiments of the present invention have been disclosed herein, one skilled in the art will recognize that various changes and modifications may be made without departing from the scope of the invention as defined by the following claims.

The invention claimed is:

1. A method of providing a cinema auditorium, comprising:
    arranging a plurality of reclining seats on a flat floor that is perpendicular to front and side walls, wherein each of said plurality of reclining seats is selectively reclinable to a recline angle ranging from 15 degrees to 70 degrees to create a seating area, wherein each of said plurality of reclining seats is oriented so that an occupant is viewing towards a first end of the seating area, wherein the plurality of reclining seats are organized as a plurality of rows which permit passage of a person between adjacent rows, and where each of the reclining seats in each of the plurality of rows are on the same flat floor at a same height relative to the front and side walls; and
    tilting a screen arranged at least twelve feet above said plurality of reclining seats at the first end of the seating area, the screen having a top being tilted toward the seating area with a screen angle of 10 to 35 degrees, wherein an occupant viewing the screen from any of the plurality of rows will view the screen with a top tilted toward the seating area with a screen angle of 10 to 35 degrees while the occupant is seated in one of the plurality of reclining seats while reclined at an angle of 15 degrees to 70 degrees.

2. The method of claim 1, further comprising the step of sloping or stepping at least a portion of a ceiling above the seating area upwards toward the first end.

3. The method of claim 1, wherein the screen is a motion picture projection screen, and further comprising placing a projector at a second end of the seating area opposite the first end for projecting images on the screen, wherein the projector is angled upwardly with respect to the seating area for projecting images onto the tilted motion picture projection screen.

\* \* \* \* \*